United States Patent [19]

Ryan et al.

[11] 4,443,697

[45] Apr. 17, 1984

[54] SYSTEM AND METHOD FOR SELECTING AND SEGREGATING CONTAINERS

[76] Inventors: David M. Ryan, No. 25, Canter La., Sherwood, Oreg. 97140; Paul A. Simmons, Rte. 3, Box 1458, Newberg, Oreg. 97132

[21] Appl. No.: 348,093

[22] Filed: Feb. 11, 1982

[51] Int. Cl.³ .............................................. G01V 9/04

[52] U.S. Cl. ................................ 250/223 R; 250/566; 100/902; 194/46

[58] Field of Search ............... 100/902; 194/4 R, 4 C, 194/4 E; 250/223 R, 566, 568; 209/583, 587, 528; 235/462, 463

[56] References Cited

U.S. PATENT DOCUMENTS

| | | | |
|---|---|---|---|
| 4,248,334 | 2/1981 | Hanley et al. | 100/902 |
| 4,285,426 | 8/1981 | Cahill | 194/4 C |
| 4,371,071 | 2/1983 | Abedor et al. | 250/223 R |

*Primary Examiner*—David C. Nelms

[57] ABSTRACT

A novel system and a method are provided for selecting and segregating used, deformable containers having a UPC designation imprinted thereon. The system is customer-operated, customer-controlled, and directly fed, respectively. The system preferably includes means for compacting and internally storing the containers after compacting.

10 Claims, 3 Drawing Figures

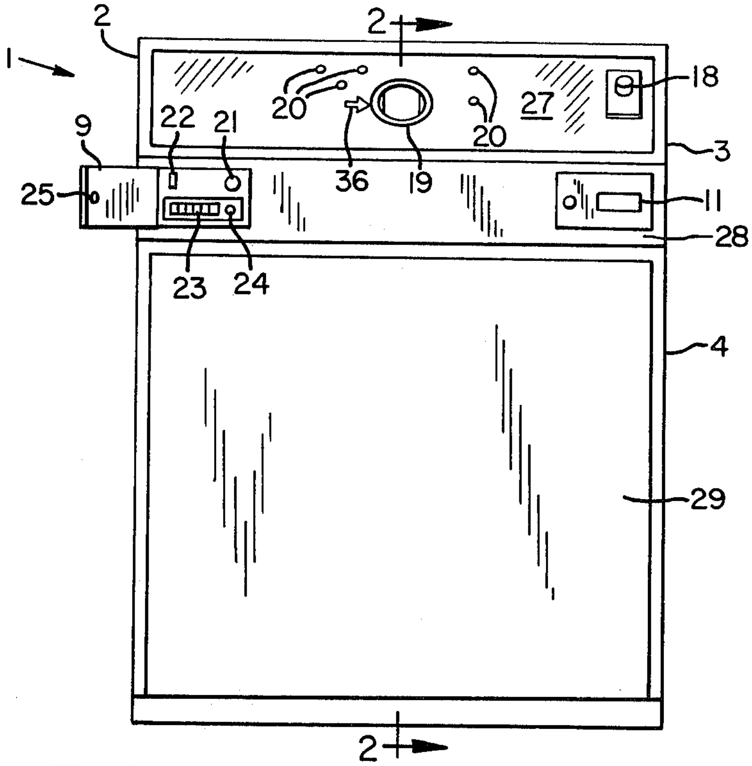
FIG. 1
FIG. 2
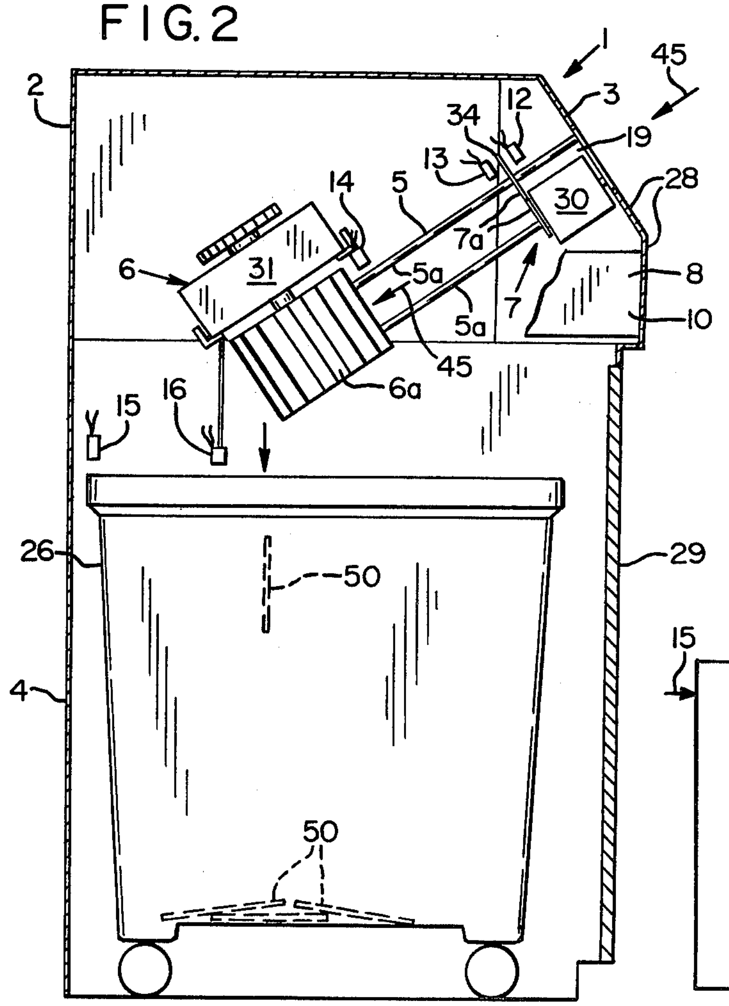
FIG. 3
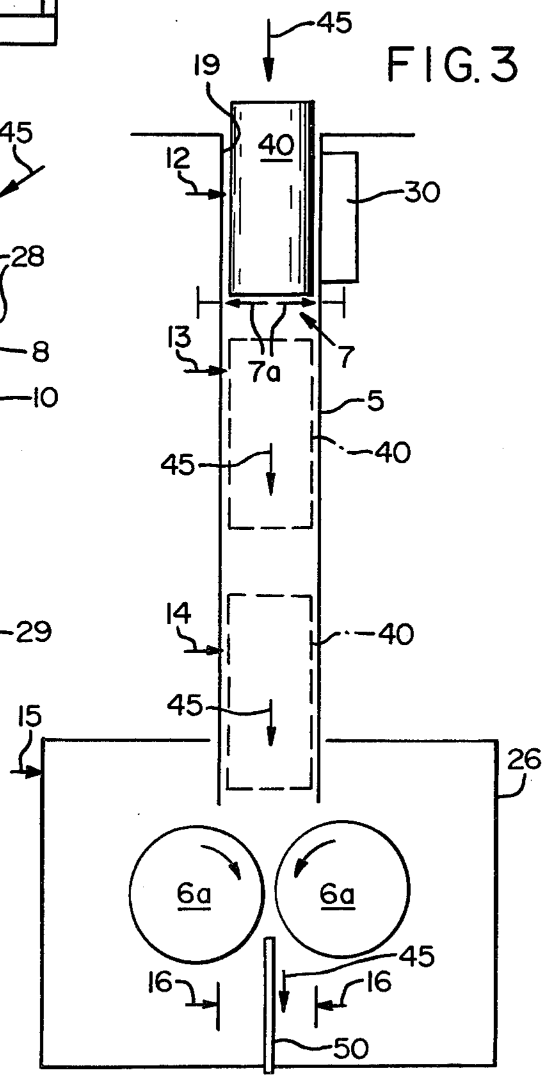

SYSTEM AND METHOD FOR SELECTING AND SEGREGATING CONTAINERS

BACKGROUND OF THE INVENTION

This invention relates to a system and a method for selecting and segregating used, deformable, recyclable containers having a UPC designation, and preferably for compacting the containers to a substantially reduced volume and then internally storing same, including a novel input means.

Various devices have been designed for compacting used cans, and for internally storing same. Most of these devices are of the nonselective, noncustomer-controled, and noncustomer-operated type. Many of these devices are of the direct feed type.

The term "nonselective" means that the containers are indiscriminately fed into the interstices of the machine, without employing a controled feed system, and without regard to certain qualitative parameters, for example, such as the brand name, i.e., Coca Cola, Seven Up, etc., or the nature of the container itself, i.e., aluminum cans, plastic bottles, etc. These systems require store employees, not customers, to feed the containers thereto.

Of the systems which are customer-operated direct feed, and nonselective, certain systems provide for internal sorting of the containers within the machine and are, therefore, noncustomer-controled. Internal sorting of all the cans fed is accomplished without the assistance of the customer in the sorting process. A more complex sorting mechanism is also required. The sorting system is internally facilitated and includes means for processing both accepted and rejected cans. Therefore, a much larger device is needed since both accepted and rejected cans alike are fed into the machine.

Most of the direct feed compacting devices are designed to be operated by the collector's employees, and not by the customer per se, i.e., they are noncustomer-operated. Direct input means are constructed so that containers are fed directly to the interstices of the apparatus without requiring the container to traverse an extensive ancillary feed path.

Indirect input, on the other hand, is defined as providing a system with an ancillary feed path, which, when traversed, imparts selectivity to the system. These indirect input systems create an obstructed flow path and a separate selection chamber. Because of the obstructed flow path, complex mechanical feeding systems must be provided. Some of these selective chambers include electromechanical scanning devices in which the containers are mechanically actuated and are mechanically impelled for rotational movements during the scanning operation.

Disposing of certain recyclable containers is a particular problem in states such as Oregon which have passed a "Bottle Bill". In these states, the customer must pay a deposit, for instance, on each can of soft drink purchased. When the customer returns the can after use, the store refunds the deposit amount to the customer. Cans must, accordingly, be physically sorted by store employees who must first determine which of the returned cans are actually deposit cans, and further, which of the deposit cans are returnable at that particular store. Some house brands are returnable only at the store of sale. Storage of used cans on the store premises is a significant and needless waste of space. Moreover, inventorying of the returned cans is a nightmare requiring untold hours of paperwork. Finally, disposal of the collected cans is a cumbersome task since they are clumsy to handle and difficult to transport.

Devices of the nonselective, noncustomer-operated, direct feed type are a problem in bottle bill states because the store employee is still obligated for hand-sorting and related activities. The crushing apparatus disclosed in U.S. Pat. No. 3,749,004 to Pagdin et al. comprising a plurality of opposed crushing rollers 7–10; and the can crushing mechanism and flattening apparatus of U.S. Pat. No. 2,619,150 to Smith, are examples of such a device.

A device for separating refuse into several debris streams, including an aluminum can stream which is crushed by a crusher means 3 is described in U.S. Pat. No. 4,257,511 to Miller. U.S. Pat. No. 3,687,062 to Frank describes a device in which discarded glass containers and cans are crushed within jaws 28 and 29 and then further crushed by rolls 20 and 21. U.S. Pat. No. 3,776,128 to Morris provides for a recycling system including crusher jaws 8 and 10 and crusher rollers 13 and 14. Finally, a device such as set forth in U.S. Pat. No. 3,907,078 to Tanaka relates to an apparatus for conveying cans and crushing same within the device. It also provides a means for dispensing a refund or redemption fee to the can depositor.

A system for nonselective sorting of containers is set forth in U.S. Pat. No. 4,248,389 to Thompson et al. The containers are internally sorted according to the UPC (Universal Product Code) designation imprinted thereon. All of the problems associated with this type of device have been previously described.

Several prior art externally selective systems are equipped with indirect, mechanically-assisted infeed means. These mechanical infeed mechanisms require the can to be rotated or moved through an internal pathway, or both, in order to analyze numerical symbols or codes located on the cans. This creates a substantial problem for customers if such mechanisms are employed as a customer-operated system in a store because of the inordinate amount of time needed to perform these ancillary analyzing functions. In one case, U.S. Pat. No. 3,412,837 to Myers, cans are placed in an indirect infeed means, in the form of a container-receiving compartment, located inside a closed access door. The cans are then conveyed for crushing by a complex track system. A stamp is dispensed for containers of a certain type. U.S. Pat. No. 4,248,334 to Hanely et al. relates to an indirect, externally selective device for accepting the return of selected types of containers and optionally tendering compensation for the return of these containers. A complex system is included for the electromechanical scanning of cans, and collecting same, according to their UPC designation. In order to read the UPC code, the can is inserted into the container receptacle, the infeed door is closed, the can is mechanically rotated and the UPC code is then indirectly optically scanned using a mirror and a laser scanner. The acceptable cans are dropped into a receptacle, employing mechanical means, and the rejected cans remain in the receptacle where they must be removed by the customer after once again opening the access door.

SUMMARY OF THE INVENTION

The present invention comprises a system and a method for selecting and segregating used, deformable, recyclable containers having a UPC designation thereon. Preferably, the system includes means for compacting the containers to a substantially reduced volume and for internally storing the compacted containers therewithin. The system includes a novel customer-operated, customer-controled input means which forms an unobstructed material flow path for the containers. The input passageway is preferably disposed in a downwardly included direction so that if the containers are determined to be acceptable, the containers are discharged into the confines of said housing means.

In the input means of this invention, contrary to certain prior art devices and even though the system is selective, customer-operated and customer-controled, the containers are inserted into an *unobstructed* passageway and then, if acceptable, traverse a direct, straight-line path from the point of entry into the confines of the system, preferably until the point at which the containers are compacted. Thus, in the system of this invention, the customer inserts the containers directly into the input passageway for selective electronic reading of the UPC designation. Prior art devices, on the other hand, employ *complex mechanical* input systems and *electro-mechanical* scanning devices requiring mechanical actuation and rotation of the container during the scanning process.

A reference guide means is provided, preferably in the form of a directional arrow, located adjacent to the entry port of the system, for aligning the UPC designation on the container with the electronic signal from the UPC reading means.

From a method standpoint, a used, returnable container having a UPC designation thereon is first inserted into the input passageway, via the entry port. The UPC designation on the container is aligned with the reference guide means. A means for reading the UPC designation, located within the confines of the system, then selectively reads same to determine whether the container is of an acceptable, returnable type. If the container is not acceptable, it is withdrawn before it is directly fed into the input passageway. If, however, the UPC reading means determines that the container is acceptable, by reading and comparing same to a predetermined set of UPC standards, the container is fed into the confines of the system where the container is preferably compacted, more preferably within a nip formed between a pair of opposed rollers, and most preferably between a pair of knurled rollers. The compacted containers are then collected, and internally stored in the confines of the system until the storage means is full. The compacted containers are then removed from the system.

After all of the acceptable cans have been returned by a customer, the customer pushes a button and the system issues a receipt to the customer setting forth the number of returned containers and the dollar value thereof, which is cashed at checkout. The receipt can also include items such as the time of day, date of the transaction, store name, and store number.

DETAILED DESCRIPTION OF THE DRAWINGS

FIG. 1 is a frontal, perspective schematic view of a preferred system of the present invention.

FIG. 2 is a sectional, side schematic view of the system depicted in FIG. 1, taken along line 2—2.

FIG. 3 is a schematic representation of the flow path of a container as it passes within the system of the present invention.

DETAILED DESCRIPTION OF THE INVENTION

Referring now to FIGS. 1 and 2, a system 1 for selecting and segregating used, deformable, recyclable containers 40, having a UPC designation thereon, is provided. The system typically comprises a housing means 2, having respective upper and lower sections 3 and 4. The upper section 3 contains most of the electronic and mechanical apparatus, while the lower section 4 contains the compacted containers 50. The upper section has a cover 28 which is attached with latches (not shown) on the inside to the lower section 4, and a front section 29 which is permanently attached to the lower section 4.

Within the confines of system 1 is a means 30, preferably in the form of an optical moving beam scanner means, for reading the UPC designation on the container. Illustrative of the optical moving beam scanner means which can be employed in this invention is the SKAN IV, manufactured by SKAN-A-MATIC Corp., of Elbridge, N.Y.

The UPC designation is typically a group of parallel dark bars of varying widths separated by white spaces. Variations of the widths of the bars and the spaces between the bars are used to encode different information.

In a UPC system, the means for reading said designation, such as optical bar code sensors, scans the UPC designation and transmits the information contained in the code to a decoder means 10, such as a microprocessor, for example, a SKAN-A-MATIC microprocessor, Module Model No. V23103.

The principle that makes the UPC system operable is that the light is reflected from a light surface and is absorbed by a dark surface. Thus, the black bars in the UPC absorb light, while the white spaces are reflective. When the means 30 scans the UPC designation, it "sees" the reflective difference between the bars and spaces and provides proportional electrical signals that are conditioned and decoded by the rest of the system.

Another function of the UPC designation is to "key" the scanning direction. Most UPC designations are bidirectional. That is, they can be scanned from left-to-right or from right-to-left. UPC's are usually scanned from left-to-right. However, if scanning is from the right, the decoder means 10 recognizes the correct bar pattern and knows that the UPC is reversed. The decoder means 10 then reverses the data again to present it in the proper format.

Specifically, optical scanners, for example, optically sense the bar code and produce electrical signals that are proportional to the bar and space widths. Signal conditioning and decoding components process these signals and divert them into characters that the bar code represents.

UPC scanners, in general, have three main components: a light source, which illuminates the UPC designation; a photodetector, which senses the presence or absence of reflective light; and a signal-conditioning circuit that converts the detector signal into amplified analog signals. An additional signal conditioner, external to the sensor, can be employed to convert the analog signals into digital signals compatible with decoding circuitry. The UPC designation preferably provides for the binary coding of ten decimal digits, the first five digits being the manufacturer's identification number, and the second five digits identifying the particular item within the product line.

An input passageway 5 which is preferably fabricated of the plurality of metal or plastic elements 5*a* provides a straight-line path 45 for the container to travel from the entry port to the interior of housing means 2, and preferably to compacter means 6, which is driven by a motor 31, and which preferably includes two crusher rollers 6*a*.

Means 7, in the closed position, is disposed for maintaining the container in a fixed, substantially stationary position within said input passageway 5 during the UPC designation reading step. If the container is determined to be acceptable, means 7 is moved to an open position, and the container is directly discharged into the confines of said housing means 2. Preferably, means 7 comprises a pair of gates 7*a*, each movable in an opposed horizontal direction away from the other. Each gate 7*a* is driven by a signal from a rotary solenoid 34 to a linkage arm (not shown).

A power means 8 for providing electrical power to system 1, such as an electric motor, is located behind a hinge-controlled door 9.

Decoder means 10 is preferably located within housing means 2, behind printer means 11, and is the central control means for system 1. Decoder means 10 controls all the functional operations of system 1, including the input-output functions from UPC reading means 30, UPC reading sensor means 12, input passageway sensor means 13, compacter sensor means 14, hopper sensor means 15, and counter sensor means 16. The printer means 11 is preferably a compact, panel-mounted, alphanumerical printer.

Means 12 is provided for sensing the introduction of a container within input passageway 5, positioned against fixed, stationary maintenance means 7, and for signalling decoder means 10 that the container is ready for its UPC designatin to be read by means 30.

Means 13 is disposed for sensing the introduction of container within input passageway 5 beyond fixed, stationary positioning means 7 and for signalling decoder means 10 that the container is moving toward compacter means 6.

Means 14 is also preferably for sensing the location of container within input passageway 5 prior to being fed to compacter means 6 and sending a signal indicating same to decoder means 10. In order to determine the number of containers being compacted by compacter means 6, a counter sensor means 16, disposed adjacent to the exit of compacter means 6, preferably in the form of a beam counter sensor means, is furnished, while a hopper sensor means 15 is provided for verifying that hopper means 26 is full of containers. Both of these latter sensor means 15 and 16 also signal decoder means 10 with the requisite container count and hopper volume information.

A photoelectric cell is preferably employed for use as the above sensor means 12–16, more preferably a 5-volt, direct-current photoelectric cell.

A receipt button 18, which is preferably illuminated to indicate whether the unit is activated, provides the customer with a receipt for redemption by the store cashier after the customer has returned all of his containers.

An unobstructed entry port 19 is provided in upper section 3 for receiving a container from a customer who feeds same directly to input passageway 5. A plurality of indicator means, in the form of light-emitting diiodes 20 are located on the panel front 25 informing the customer of location and status of the container.

A mode-control means 21, preferably in the form of a three-position switch, controls the functional modes of the system 1 by selection of the desired mode. The preferred switch positions are (a) off—device totally shut down; (b) run—normal operations take place; and (c) reset—selected operations are conducted, preferably employing thumb wheel 22. Thumb wheel 22 is a multi-digital thumb wheel. The thumb wheel preferably includes positions from normal operation, daily and total container reports, and operator-controled check-out of the input-output operation of device 1, to various other special check-out positions. Furthermore, a maintenance CRT can be provided to analyze the condition of the entire device.

A container counter means 23 is also provided. This is preferably a key, resettable counter 24 that is activated by central control processor means 10. A door 25 provides access to a hopper which stores the crushed containers.

In use, the device 1 is typically operational on a twenty-four-hour basis, except for the UPC reading means 30, in order to extend the device's working life. First, the customer reads the basic instructions on front panel 27. Then, the customer begins by inserting the container into entry port 19 so that it extends within input passageway 5, aligning the UPC designation on the container with reference guide means 36. In place within input passageway 5, the bottom of the container will rest in a fixed, stationary state against positioning means 7. The sensing means 12 signals the decoding means 10 that a container is ready for processing. Decoding means 10 will also analyze the signal from the hopper sensor means 15 to determine if hopper 26 is in position within the confines of housing 2. Then, sensor means 15 will signal to decoder means 10, based on the container count limit, when hopper 2 is full. If the hopper is full, the appropriate LED 20 is activated to inform the customer that the hopper must be emptied.

If the hopper 26 is not full, the UPC reading means 30 will scan the UPC designation on the container. When the UPC is read, an LED is activated, and the UPC designation on the container is compared to the acceptable UPC standards set for the system. If the UPC designation does not match one of the acceptable standards, the container is rejected and a reject light is actuated. When the UPC designation matches one of the acceptable standards, on the other hand, an audible beeping sound is heard and the accept light comes on. the decoding means 10 then signals, via sensor means 13, that maintaining means 7 be moved to an open position to allow the container to pass, preferably by gravity, down passageway 5 until it is fed to compacter means 6. Sensor means 13 and 14 will then signal when the container has passed by them. Maintaining means 7 is then shut closed behind the container. Sensor means 14 will signal that the container is ready to be compacted. Decoder means 10 then actuates the compacter motor, the container is compacted, it exits the compacter means 6, interrupts the counter sensor means 16, is counted, and then falls into the hopper 26 to be stored. The decoder means 20 will then trip the can counter 23 as each can drops into the hopper. This compaction cycle will be repeated until the customer has returned all of his containers, then the customer depresses the receipt button 18, and the printer 11 will print a receipt with the can count and the dollar value of the customer's cans for redemption. Additional information such as the store number and store name can also appear on the redemption receipt.

We claim:

1. A system for selecting and segregating used, deformable, recyclable containers having a UPC designation thereon, comprising a housing means; and a direct-feed, direct-input, customer-operated, customer-controled input means, said input means comprising an unobstructed entry port for receiving a container from a customer and an input passageway means which provides a straight-line path for a container to travel from the entry port to the confines of the housing means; means for reading the UPC designation on said container; reference guide means for aligning the UPC designation on said container with the UPC designation reading means; and means for maintaining said container in a fixed, stationary position during said UPC designation reading operation and, if said container is acceptable, for discharging same into the confines of said housing means.

2. The system of claim 1, which further includes means for compacting said containers to a substantially reduced volume, and means for internally storing said compacted containers within the confines of said housing means.

3. The system of claim 1, wherein said input passageway is disposed in a downwardly inclined direction and said cans are discharged into the confines of said housing by gravity.

4. The system of claim 1, wherein said UPC reading means comprises an optical moving beam scanning means.

5. The system of claim 1, wherein said straight-line path of said input passageway means extends from said entry port to said compacter means.

6. The system of claim 1, wherein said position-maintaining means comprises a pair of gate means movable in opposed horizontal directions away from each other.

7. The system of claim 1, which includes means for sensing the introduction of the container within said input passageway means for positioning same against said fixed, stationary maintenance means and for signalling a decoder means that the container is ready to have its UPC designation read by said UPC designation reading means.

8. A method for selecting and segregating used, deformable, recyclable containers having a UPC designation thereon, comprising the steps of (a) inserting each of said containers into an input means comprising an unobstructed entry port and input passageway, respectively, located within a housing means, said input passageway providing a straight-line material flow path for said containers to travel from said entry port to the confines of said housing means;

(b) aligning the UPC designation on said container with a reference guide means located adjacent to the peripheral edge of said entry port;

(c) reading the UPC designation on each container to selectively determine whether the container is of an acceptable, returnable type;

(d) maintaining said container in a substantially fixed, stationary position during UPC designation reading step;

(e) withdrawing unacceptable containers from within said entry port; and (f) directly discharging the acceptable containers into the confines of the housing.

9. The method of claim 8, which includes the further step of compacting said container to a substantially reduced volume after directly discharging same into the confines of said housing means.

10. The method of claim 8, which includes the further step of feeding the container from the entry port to the confines of the housing means by gravity, employing a downwardly inclined material flow path.

* * * * *